United States Patent Office 2,908,679
Patented Oct. 13, 1959

2,908,679
AZO-DYESTUFFS INSOLUBLE IN WATER

Herbert Kracker, Fritz Bauer, Werner Kirst, Rudolf Lowenfeld, and Walter Staab, Offenbach (Main), Germany, assignors to Farbwerke Hoechst Aktiengesellschaft vormals Meister Lucius & Bruning, Frankfurt am Main, Germany, a corporation of Germany No Drawing. Application December 17, 1957
Serial No. 703,271

Claims priority, application Germany December 19, 1956

7 Claims. (Cl. 260—188)

The present invention relates to valuable new azo-dyestuffs insoluble in water and to a process for producing these dyestuffs on shaped structures of aromatic polyesters or cellulose acetate; more particularly it relates to azo-dyestuffs corresponding to the following general formula

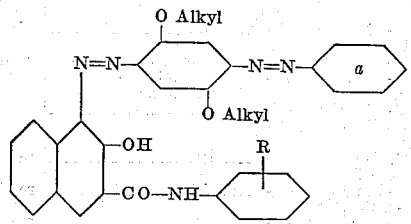

wherein the benzene nucleus a may be substituted by an alkyl or alkoxy group and/or a halogen atom, and R represents hydrogen, an alkyl or alkoxy group.

We have found that valuable water-insoluble azo-dyestuffs can be produced on shaped structures of aromatic polyesters, for example fibers, foils, fabrics or ribbons, by coupling on these structures the diazonium compound of an aminoazo-compound corresponding to the general formula

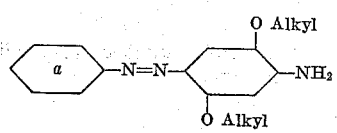

wherein the benzene nucleus a may be substituted by an alkyl or alkoxy group and/or a halogen atom, with an arylamide of 2,3-hydroxynaphthoic acid of the general formula

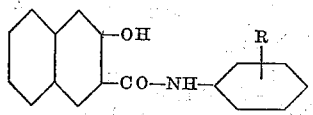

wherein R represents a hydrogen atom, an alkyl or alkoxy group. According to this process blue dyeings are produced which are distinguished by good properties of fastness and in many cases possess a good evening shade.

The dyestuffs can be prepared by applying the aminoazo-compound simultaneously with the coupling component, suitably in dissolved or finely dispersed form, to the polyester material, then diazotizing the aminoazo-compound in the heat and completing the coupling with the coupling component in known manner. It is especially suitable to produce the dyeings by applying the coupling component and the aminoazo-compound to the shaped structure from an alkaline solution or suspension in the presence of a solution promoter, such as tetrahydronaphthalene, while simultaneously lowering the pH-value of the solution or suspension by the addition of an ammonium salt of an inorganic or organic acid, an ester or acid halide of an organic acid or an alpha-halogenated fatty acid, then diazotizing the aminoazo-compound and coupling it with the coupling component. For dyeing in a continuous manner the structure can also be treated in a short liquor with the aminoazo-compound and the coupling component while the amine and coupling component are in solution in an organic solvent, subsequently it is subjected to a steaming operation or to a dry heat treatment and the dyeing is then developed in known manner by diazotization and coupling. Finally, the coupling component can be applied together with the aminoazo-compound to the textile material, at a temperature of above 100° C., from an alkaline solution or suspension in the presence of a solvent, such as diacetone alcohol, a solution promoter for the coupling component, such as tetrahydronaphthalene or methoxybutyl acetate, an alkali metal salt of a sulfonated oleic acid and a compound lowering the pH-value of the solution or suspension, the aminoazo-compound is then diazotized and coupled with the coupling component. When there is used as a solution promoter an ester, for example methoxybutyl acetate, the addition of a further compound lowering the pH-value of the solution or suspension may, if desired, be dispensed with.

The process of this invention is very suitable for the production of valuable dyestuffs on the condensation products of polyvalent aromatic carboxylic acids with polyhydric alcohols commonly designated as aromatic polyester fibers, especially of the type of the polyethyleneglycol terephthalate. It can also be carried out on shaped structures of cellulose acetate.

The aminoazo-compounds used as diazo components, which have not been completely described in literature, can be prepared by known methods, for example by coupling diazotized aniline or the substitution products thereof with 1-amino-2,5-dialkoxybenzenes.

The following examples illustrate the invention, but they are not intended to limit it thereto.

Example 1

100 kilograms of polyethyleneglycol terephthalate material in the form of yarn or fabric are treated for 1 hour at 120° C. in the following bath: 0.6 kilogram of 1-(2',3'-hydroxynaphthoylamino)-2-methoxybenzene and 0.56 kilogram of 4-amino-2,5-dimethoxy-4'-chloro-1,1'-azobenzene are dissolved at 80° C. in a mixture of 0.225 liter of sodium hydroxide solution of 38° Bé., 3 liters of diacetone alcohol, 1 liter of tetrahydronaphthalene, 0.57 kilogram of a dispersing agent of the type of an alkylaryl sulfonate, 0.2 kilogram of butyl alcohol and 0.5 kilogram of diglycol and the solution is introduced into 1500 liters of water of 90° C. to which there is added 0.225 kilogram of tartaric acid diethylester.

The material is then cooled to 80° C., rinsed hot and cold and diazotized with 2.25 kilograms of sodium nitrite and 7.5 kilograms of sulfuric acid of 96% strength in 1500 liters of water, by introducing the material, heating the bath to 80° C. and treating for 30 minutes at 80–85° C.

The material is then rinsed, after-treated for 15 minutes at 95° C. with 9 liters of a sodium hydroxide solution of 38° Bé., 3 kilograms of sodium dithionite and 3 kilograms of a non-ionogenic washing agent in 1500 liters of water, rinsed again and dried. A navy blue dyeing of very good properties of fastness is obtained.

When there is used in the above example 0.6 kilogram of 4-amino-2,5,4'-trimethoxy-1,1'-azobenzene instead of 0.56 kilogram of 4-amino-2,5-dimethoxy-4'-chloro-1,1'-azobenzene, a greenish navy blue dyeing of similar good fastness properties is obtained.

*Example 2*

100 kilograms of polyethyleneglycol terephthalate material in the form of yarn or fabric are treated for 30 minutes at boiling temperature in the following bath: 0.9 kilogram of 1-(2',3'-hydroxynaphthoylamino)-2-methoxybenzene and 1 kilogram of 4-amino-2,2',5-trimethoxy-1,1'-azobenzene are dissolved in the hot in a mixture of 4.8 kilograms of tetrahydronaphthalene, 2.5 kilograms of diglycol, 4 kilograms of a dispersing agent of the type of an alkylaryl sulfonate, 0.72 kilogram of butyl alcohol, 0.3 kilogram of methylhexalin and 0.31 liter of sodium hydroxide solution of 38° Bé. and introduced into 3000 liters of soft water of 90° C., to which 0.4 kilogram of tartaric acid diethylester has been added. The material is then rinsed hot and cold and diazotization is carried out with 6 kilograms of sodium nitrite and 9 kilograms of sulfuric acid of 96% strength in 3000 liters of water by introducing the material, heating the bath to 80° C. and treating for 30 minutes at 80–85° C.

The material is then rinsed, after-treated for 15 minutes at 95° C. with 12 liters of sodium hydroxide solution of 38° Bé., 3 kilograms of sodium dithionite and 3 kilograms of a non-ionogenic washing agent in 3000 liters of water, rinsed again and dried.

A navy blue dyeing of very good properties of fastness is obtained.

*Example 3*

100 kilograms of triacetyl cellulose in the form of continuous thread are treated for 1 hour at 95–100° C. in the following bath: 0.9 kilogram of 1-(2',3'-hydroxynaphthoylamino)-2-methoxybenzene and 0.9 kilogram of 4-amino-2,5,4'-trimethoxy-1,1'-azobenzene are dissolved in a hot mixture of 4.8 kilograms of tetrahydronaphthalene, 2.5 kilograms of diglycol, 4 kilograms of a dispersing agent of the type of an alkylaryl sulfonate, 0.72 kilogram of butyl alcohol, 0.3 kilogram of methylhexalin and 0.3 liter of sodium hydroxide solution of 38° Bé. and introduced into 3000 liters of water of 90° C. to which 0.4 kilogram of tartaric acid diethylester has been added.

The material is then rinsed and diazotized with 6 kilograms of sodium nitrite and 9 kilograms of sulfuric acid of 96% strength in 3000 liters of water by introducing the material, heating the bath to 50° C. and treating at this temperature for 30 minutes. The material is then rinsed, after-treated for 15 minutes at 60° C. with 9 liters of sodium hydroxide solution of 38° Bé., 3 kilograms of sodium dithionite and 3 kilograms of a non-ionogenic washing agent in 3000 liters of water, rinsed again and dried.

A navy blue dyeing of good fastness properties is obtained.

When there is used in the above example 0.7 kilogram of 4-amino-2,5-dimethoxy-4'-chloro-1,1' azobenzene instead of 0.9 kilogram of 4-amino-2,5,4'-trimethoxy-1,1'-azobenzene, a reddish navy blue dyeing is obtained.

Similar results are obtained by using shaped structures of 2,5-acetyl cellulose.

The following table comprises a number of further components which can be used in the process of this invention and the tints of the azo-dyestuffs produced with these components on polyesters or cellulose acetate, which likewise possess good properties of fastness:

| Diazo component | Coupling component | Tint |
| --- | --- | --- |
| 4-amino-2,5-dimethoxy-1,1'-azobenzene. | 1-(2',3'-hydroxynaphthoylamino)-2-methoxybenzene. | Navy blue. |
| 4-amino-2,5-diethoxy-1,1'-azobenzene. | do | reddish navy blue. |
| 4-amino-2,5-dimethoxy-3'-methyl-4'-chloro-1,1'-azobenzene. | do | navy blue. |
| 4-amino-2,5-dimethoxy-2'-methyl-3'-chloro-1,1'-azobenzene. | do | Do. |
| 4-amino-2,5,4'-trimethoxy-3'-chloro-1,1'-azobenzene. | do | Do. |
| 4-amino-2,5-dimethoxy-3'-chloro-4'-methyl-1,1'-azobenzene. | do | Do. |
| 4-amino-2,5-dimethoxy-2'-methyl-4'-chloro-1,1'-azobenzene. | do | Do. |
| 4-amino-2,5-dimethoxy-2'-ethoxy-1,1'-azobenzene. | do | greenish navy blue. |
| 4-amino-2,5-dimethoxy-4'-ethoxy-1,1'-azobenzene. | do | Do. |
| 4-amino-2,5-diethoxy-4'-methoxy-1,1'-azobenzene. | do | greenish blue. |
| 4-amino-2,5-dimethoxy-3'-methyl-4'-chloro-1,1'-azobenzene. | 1-(2',3'-hydroxynaphthoyl-amino)-2-methylbenzene. | greenish navy blue. |
| 4-amino-2,5-dimethoxy-2'-methyl-3'-chloro-1,1'-azobenzene. | do | Do. |
| 4-amino-2,5,4'-trimethoxy-1,1'-azobenzene. | do | Do. |
| 4-amino-2,5-dimethoxy-4'-chloro-1,1'-azobenzene. | do | Do. |
| 4-amino-2,5-dimethoxy-2'-chloro-1,1'-azobenzene. | do | covered greenish dark blue. |
| 4-amino-2,5-dimethoxy-3'-chloro-1,1'-azobenzene. | do | covered dark blue. |
| 4-amino-2,5-dimethoxy-3'-methyl-4'-chloro-1,1'-azobenzene. | 1-(2',3'-hydroxynaphthoylamino)-2-ethoxybenzene. | reddish navy blue. |
| 4-amino-2,5-dimethoxy-2'-methyl-3'-chloro-1,1'-azobenzene. | do | Do. |
| 4-amino-2,5,4'-trimethoxy-1,1'-azobenzene. | do | navy blue. |
| 4-amino-2,5-dimethoxy-4'-chloro-1,1'-azobenzene. | do | reddish navy blue. |
| 4-amino-2,5-dimethoxy-2'-chloro-1,1'-azobenzene. | do | covered reddish dark blue. |
| 4-amino-2,5-dimethoxy-3'-chloro-1,1'-azobenzene. | do | reddish navy blue. |
| 4-amino-2,5-dimethoxy-2'-methyl-3'-chloro-1,1'-azobenzene. | 2,3-hydroxynaphthoyl-aminobenzene. | grey-blue. |
| 4-amino-2,5,4'-trimethoxy-1,1'-azobenzene. | 1-(2',3'-hydroxynaphthoyl-amino)-2-ethylbenzene. | navy blue. |

We claim:

1. Water-insoluble azo-dyestuffs corresponding to the following general formula

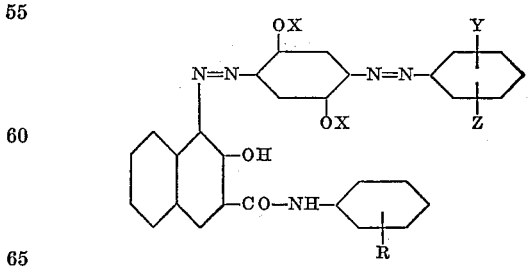

wherein R represents a member selected from the group consisting of hydrogen, methyl, ethyl, methoxy and ethoxy, X represents a member selected from the group consisting of methyl and ethyl, Y represents a member selected from the group consisting of hydrogen and chlorine, and Z represents a member selected from the group consisting of hydrogen, methyl, methoxy and ethoxy.

2. Water-insoluble azo-dyestuffs corresponding to the following general formula

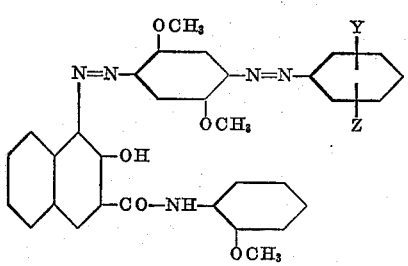

wherein Y represents a member selected from the group consisting of hydrogen and chlorine, and Z represents a member selected from the group consisting of hydrogen, methyl, methoxy and ethoxy.

3. The azo-dyestuff corresponding to the following formula

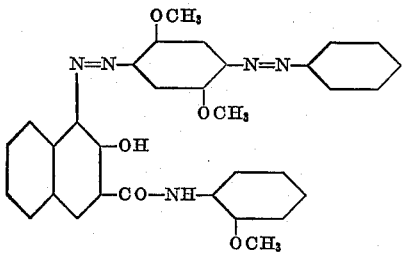

4. The azo-dyestuff corresponding to the following formula

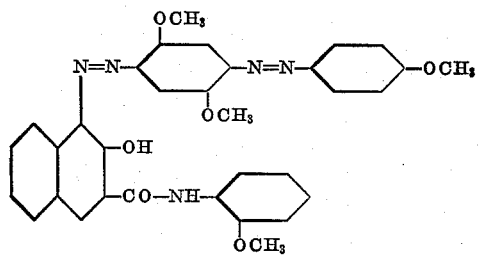

5. The azo-dyestuff corresponding to the following formula

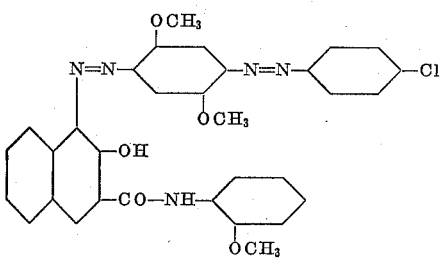

6. The azo-dyestuff corresponding to the following formula

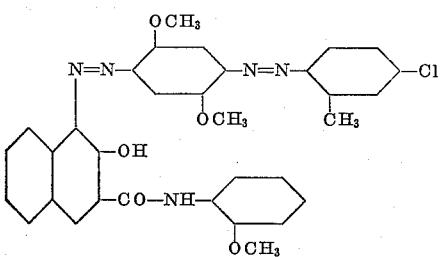

7. The azo-dyestuff corresponding to the following formula.

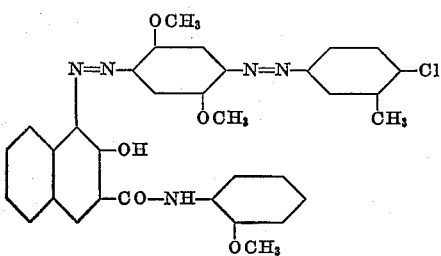

References Cited in the file of this patent
UNITED STATES PATENTS

| | | |
|---|---|---|
| 1,871,947 | Bonholte | Aug. 16, 1932 |
| 2,069,158 | Schnitzpahn et al. | Jan. 26, 1937 |
| 2,153,018 | Heyna et al. | Apr. 4, 1939 |